Jan. 12, 1954   J. A. LAUCK   2,665,638
GEAR PUMP
Filed Oct. 21, 1949
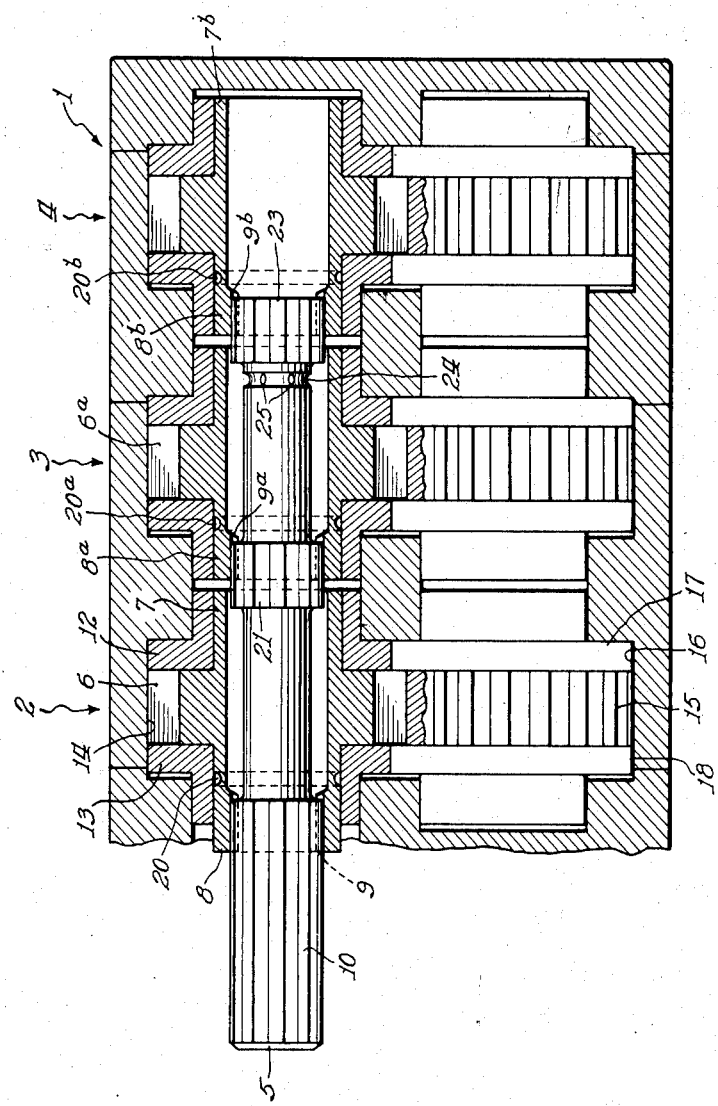
Inventor:
John A. Lauck
By Elmore C. Fitzgerald
Atty.

Patented Jan. 12, 1954

2,665,638

UNITED STATES PATENT OFFICE 2,665,638

GEAR PUMP

John A. Lauck, Shaker Heights, Ohio, assignor to Borg-Warner Corporation, Chicago, Ill., a corporation of Illinois Application October 21, 1949, Serial No. 122,786

8 Claims. (Cl. 103—4)

This invention relates to driving mechanisms, and more particularly to a shaft driving arrangement whereby a plurality of rotatable elements, such as gears, may be mounted on and rotated by a common driving shaft, the driving mechanism being so arranged that any one gear may seize and shear without disrupting the operation of the remaining gears.

It is sometimes desirable to mount a plurality of driving elements on a single shaft for rotation therewith. Thus, for example, in certain uses, particularly in aircraft installations, it has been found that it is desirable to provide stand-by pumping equipment arranged to become immediately effective upon failure of the primary pump. Such an arrangement may include mounting the driving gears of each pump on a common shaft, as shown in my co-pending application Serial No. 746,584, filed May 7, 1947. In certain highly critical uses, it may even be necessary to provide stand-by equipment for the stand-by equipment. Thus, there may be a primary fuel pump, a first emergency fuel pump and a second emergency fuel pump. Where pressure loadable pumps are employed, it is quite feasible to mount the driving gears of all such pumps on a single shaft and to select the operating pump merely by causing that pump to become pressure loaded and relieving the loading pressures on the remaining pumps. Where a plurality of such pumps are mounted on a single shaft, it is, however, necessary to provide some means whereby in the event of seizure of one or more of the pumps, the remaining pumps can continue to operate.

An object of the present invention is to provide a new and improved driving mechanism whereby a plurality of rotatable elements may be mounted on a common driving shaft and any one of the rotatable elements permitted to seize without disrupting the operation of the remaining rotatable elements.

In accordance with one embodiment of this invention as applied to the problem of driving a plurality of sets of tandem gear pumps having their driving gears mounted on and rotatable by a common quill shaft, each gear has integrally formed therewith one hollow journal member partially splined on the inner side thereof, whereby the respective gears are keyed to suitably located splined portions of the quill shaft. Each splined gear journal member has an annular peripheral shearing groove formed therein and so located with respect to the splined portion of the journal and the corresponding splined portion of the quill shaft that any one of the gears may seize and the driving connection between that gear and the shaft will shear, thereby permitting continued operation of the remaining gears.

Other objects and advantages of the present invention will be apparent from the following detailed description taken in conjunction with the drawings, wherein the single figure is a fragmentary, axial, sectional view of a plural unit tandem gear pump incorporating a driving arrangement in accordance with this invention.

Referring now to the drawing, a gear pump housing 1 is there illustrated enclosing three sets of tandem connected intermeshing gear pumps designated 2, 3 and 4. Each of these gear pumps in the embodiment illustrated is substantially identical to the others and consequently only the gear pump 2 will be described in detail.

The gear pump 2 is of the pressure loaded type, the same being more fully described in United States Patent No. 2,420,622 to Roth et al., whereby by controlling the pressure loading of the pressure loadable bushings, the pump may be caused to become effective or to become ineffective. More specifically, the pump 2 comprises a driving gear 6 having hollow journal members 7 and 8 extending respectively from the right and left sides thereof and integrally formed therewith. The driving gear 6 is splined to the quill shaft 5 for rotation therewith by axially extending splines 9 formed adjacent the left end portion of journal member 8. The splines 9 engage only the right end portion of a first splined portion 10 of the quill shaft 5.

The driving gear 6 and journal members 7 and 8 are supported in flanged bushings 12 and 13, mounted on the right and left sides thereof, respectively, the assembly being located in a first pump gear and bushing receiving bore 14 formed in the housing 1. Either of the bushings may be made axially movable, and in the drawing the left bushing 13 has been made axially movable and means (not shown) are provided for communicating discharge pressure to the rear or motive surfaces of this movable bushing to move said bushing into sealing relation with the adjacent side surfaces of the driving gear 6. This is explained in detail in the aforementioned patent to Roth et al. Means (not shown) may also be provided for relieving the loading pressure on the movable bushings to cause unloading of the pump.

The driving gear 6 meshes with a driven gear 15 disposed in a second bore 16 formed in the housing 1 adjacent the bore 14 and having its axis extending parallel thereto. Gear 15 is rotatably supported by a fixed right bushing 17 and an axially movable left bushing 18, the left bushing 18 being pressure loadable and unloadable in the same manner and by the same means as the bushing 13.

It will be noted that an annular groove 20 is formed about the periphery of the left journal member 8 at a point so located that the groove is positioned immediately to the right of the internally splined portion 9. It will be further noted that the right end of the internally splined portion 9 substantially coincides with the right end of the peripherally splined portion 10 of the shaft 5. The shaft 5 to the right of the splined portion 10 is reduced in diameter for substantially the length of the gear 6 and associated journal members and does not contact the same at any point except splines 10, the gear 6 and associated journals being supported by bushings 12 and 13. Thus, the sole engagement between the quill shaft 5 and the driving gear 6 is provided by the splined portion 9. In the event that the driving gear 6 or the driven gear 15 should seize, then the shear section defined by the annular groove 20 would shear, thereby interrupting or breaking the connection between the driving gear 6 and the quill shaft 5. The quill shaft may then continue to rotate unaffected by the breakdown of pump 2.

Each of the remaining pumps 3 and 4 are similarly splined to the quill shaft 5. Thus, the pump set designated 3 has a splined portion 9a integrally formed with the inner side of left journal member 8a and this splined portion 9a engages a splined portion 21 formed on the periphery of the quill shaft 5, the splined portion 22 beginning immediately before the termination of the right journal member 7 of the driving gear 6 and extending into the left journal member 8a of the driving gear 6a of the pump set 3. Beyond the splined portion 21, the cross sectional dimension of quill shaft 5 is again reduced as in pump set 2. Annular groove 20a is formed about the periphery of left journal member 8a immediately to the right of the termination of the splined section 9a and provides a shear section.

The pump set 4 is similarly provided with a shear section by an annular groove 20b formed about the periphery of left journal member 8b, the journal member 8b being provided with an internally splined portion 9b adapted to engage a third splined portion 23 formed about the periphery of the quill shaft 5 and extending into splined portion 9b. More pump sets or gears may be employed as required. On the last pump set it is not necessary to reduce the cross section of the portion of quill shaft 5 to the right of the last splined portion and the right portion of the quill shaft may be journalled in the journal members 7b and 8b to maintain the alignment of shaft 5 with respect to the pump sets.

From the foregoing it will be apparent that while all of the pump sets may be initially driven by the quill shaft 5, and the pump sets having pressure loading applied to their pressure loadable bushings rendered effective, upon seizure or sufficient resistance to rotation occurring at any of the pump sets, the shear section provided by the annular groove in the journal member associated with the driving gear of the seized pump set will shear. Such shearing does not affect the operation of any of the other driving gears and it will be apparent that each of the driving connections may shear independently of the others.

As an alternative measure, the extreme right pump set 4 may be provided with a differently arranged shear section. Thus, an annular groove 24 may be formed about the periphery of the quill shaft immediately to the left of the splined portion 23. This groove is made sufficiently deep or the section weakened as by the radially extending apertures 25 so that upon a predetermined resistance being encountered, as by seizure, in the pump set 4, the shear section will part. When this alternative shear section is provided, it is unnecessary to provide the shear section defined by the right groove 20b.

While this invention has been described primarily in conjunction with a plurality of gear pumps, it will be understood that this use is only exemplary and that the present invention is equally applicable to any situation wherein a plurality of driving elements are to be rotated by and mounted on a common shaft. Furthermore, it will be apparent that while only three sets of driving elements have been illustrated, there is, except for practical limitations, no limitation on the number of driving elements and shear sections which could be so provided.

Where herein the various parts of this invention have been referred to as being located in a right or a left position, it will be understood that this is done solely for the purpose of facilitating description and that such references relate only to the relative positions of the parts as shown in the accompanying drawings.

While but one embodiment of this invention has been shown and described, it will be apparent that many changes and modifications may be made therein without departing from the spirit or scope of the present invention.

What is claimed is:

1. A driving mechanism including an elongated quill shaft, a plurality of rotatable elements mounted on said quill shaft in axially spaced relation, each of said rotatable elements having a journal member associated therewith and fixed thereto, each of said journal members having an internally splined portion, a plurality of peripherally splined portions formed on said quill shaft and located so as to be engaged by the splined portions of said journal members to form driving connections therewith, and each of said journal members having a shear section formed therein and located between the driving connection and the rotatable element whereby upon occurrence of a predetermined excessive torque on a particular rotatable element, the shear section of its associated journal member will shear, thereby separating the splined portion of said journal member from the rotatable element.

2. A driving mechanism including an elongated quill shaft, a plurality of rotatable elements mounted on said quill shaft in axially spaced relation, each of said rotatable elements having a journal member associated therewith and fixed thereto, each of said journal members having an internally splined portion, a plurality of peripherally splined portions formed on said quill shaft and located so as to be engaged by the splined portions of said journal members, and each of said journal members having a shear section formed therein whereby upon occurrence of a predetermined excessive torque on a particular rotatable element, the shear section of its associated journal member will shear, thereby separating the splined portion of said journal member from the rotatable element, each of said shear sections comprising an annular groove formed in each said journal member and located between the rotatable element and the splined portion of said journal member.

3. A driving mechanism for rotating a plurality of rotatable elements mounted on a common drive shaft in axially spaced relation and permitting any one or more of said elements to cease rotating without interrupting the rotation of the remaining elements, said mechanism comprising a plurality of driving portions, one of said driving portions associated with each of said elements and connected thereto by a weakened shear section located between said driving portion and its associated element, each of said driving portions being drivably connected to said common drive shaft, said shear sections allowing a rotatable element to shear from its associated driving portion upon occurrence of excessive torque on that particular rotatable element so that said common drive shaft may continue to drive the remaining rotatable elements.

4. A driving mechanism for rotating a plurality of rotatable elements supported on a common shaft and permitting cessation of rotation of any one or more of the rotatable elements without cessation of rotation of the other rotatable elements or cessation of rotation of the common driving shaft, said driving mechanism comprising a plurality of means defining shear sections of reduced cross section, one of said shear section, associated with each of said rotatable elements, and a shaft coupling for each rotatable element connected to said shaft for rotation therewith and connected to each rotatable element through said shear section for rotation of said element, said shear sections being located between said shaft coupling and said rotatable element.

5. An intermeshing gear type pump assembly including means defining an enclosing housing having a first intermeshing gear pump unit arranged to normally function as a primary liquid transfer pump, a second intermeshing gear pump arranged to function normally as a first emergency liquid transfer pump, and a third intermeshing gear pump arranged to function as a second emergency liquid transfer pump, each of said pumps including a driving gear and a driven gear, means for continuously driving the three said pumps and adapted to be connected to a suitable source of power, means for connecting the driving gears of each of said pumps to said continuous driving means, said connecting means including an independent shear section and a splined portion for each pump, said shear section including a reduced cross section located between the driving gear of its associated pump and the splined portion and being arranged to shear in response to the occurrence of a predetermined excessive shearing force from a resistance to turning by the corresponding one of said pumps to thus produce shearing of the particular shear portion associated with said pump, and upon occurrence of the shearing of one or more of said shear sections said driving means is effective to drive the remaining pumps through the other shear sections.

6. An intermeshing gear type pump assembly including means defining an enclosing housing having a first intermeshing gear pump unit, a second intermeshing gear pump unit, and a third intermeshing gear pump unit, each of said gear pump units including a driving gear and a driven gear, a drive shaft connecting the three said pumps in continuous driving relation and adapted to be connected to a suitable source of power, means connecting said gear pumps to said drive shaft and including a journal on the driving gear of each gear pump unit, each of said journals including a shear section being defined by an annular peripheral groove, each of said shear sections being arranged to shear in response to the occurrence of a predetermined excessive shearing force resulting from the resistance to turning by the corresponding one of said pumps, and each of said shear sections further being effective to allow said driving means to continue driving the remaining pumps upon the occurrence of the shearing of the section associated with its particular pump.

7. An intermeshing gear type pump assembly including means defining a housing having a first intermeshing gear pump unit, a second intermeshing gear pump unit, and a third intermeshing gear pump unit, each of said gear pump units including a driving gear and a driven gear, said gear pump units being arranged in spaced relationship, a quill shaft adapted to drive said pumps in unison and including peripheral external splined portions, sleeve portions on said intermeshing gears, one of said sleeve portions for each of said driving gears, said sleeve portions including internal splines corresponding to the external splines of the quill shaft and adapted to be engaged thereby, said sleeve portions having a shear section of reduced cross sectional area located between said splines and said driving gear so as to allow separation of said sleeve from its corresponding gear in response to a predetermined excessive shearing force caused by the resistance to turning of its corresponding gear and thus be effective to allow the remaining pumps to be driven in unison.

8. A driving mechanism including an elongated quill shaft, a plurality of rotatable elements mounted in said quill shaft in axially spaced relation, each of said rotatable elements having a journal member associated therewith and fixed thereto, each of said journal members having internally splined portions, a plurality of peripherally splined portions formed on said quill shaft and located so as to be engaged by the splined portions of said journal members, said quill shaft between the splined portions thereof being of a diameter less than the internal diameter of said journal member and rotatable elements whereby the sole engagement of the quill shaft and the rotatable elements is provided by the splined portions, and each of said journal members having a shear section formed therein and located between the splined portion and the rotatable element whereby upon occurrence of a predetermined excessive torque on a particular rotatable element, the shear section of its associated journal member will shear, thereby separating the splined portion of said journal member from the rotatable element and allowing said quill shaft to rotate clear of the rotatable element and journal member.

JOHN A. LAUCK.

References Cited in the file of this patent

UNITED STATES PATENTS

| Number | Name | Date |
|---|---|---|
| 1,218,300 | Nelson | Mar. 6, 1917 |
| 1,607,383 | Aurand | Nov. 16, 1926 |
| 1,629,121 | Russell et al. | May 17, 1927 |
| 1,665,026 | Grant | Apr. 3, 1928 |
| 2,280,392 | Herman et al. | Apr. 21, 1942 |
| 2,356,322 | Johnson | Aug. 22, 1944 |
| 2,361,226 | Miner Jr., et al. | Oct. 24, 1944 |
| 2,487,449 | Knudson | Nov. 8, 1949 |

FOREIGN PATENTS

| Number | Country | Date |
|---|---|---|
| 579,582 | Great Britain | Aug. 8, 1946 |